(12) United States Patent
Yuan et al.

(10) Patent No.: US 11,305,780 B2
(45) Date of Patent: Apr. 19, 2022

(54) ROAD CONDITION STATUS PREDICTION METHOD, DEVICE, AND SERVER, AND STORAGE MEDIUM

(71) Applicant: TENCENT TECHNOLOGY (SHENZHEN) COMPANY LIMITED, Guangdong (CN)

(72) Inventors: Chen Yuan, Shenzhen (CN); Hong Chao Zhao, Shenzhen (CN); Bo Li, Shenzhen (CN); Zhi Jun Wang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 388 days.

(21) Appl. No.: 16/508,771

(22) Filed: Jul. 11, 2019

(65) Prior Publication Data

US 2019/0329788 A1      Oct. 31, 2019

Related U.S. Application Data

(63) Continuation of application No. PCT/CN2018/079872, filed on Mar. 21, 2018.

(30) Foreign Application Priority Data

Apr. 14, 2017   (CN) .......................... 201710244869.4

(51) Int. Cl.
*B60W 50/00* (2006.01)
*B60W 40/06* (2012.01)
(Continued)

(52) U.S. Cl.
CPC ........ *B60W 50/0097* (2013.01); *B60W 40/06* (2013.01); *G06N 5/046* (2013.01); *G06N 7/005* (2013.01)

(58) Field of Classification Search
CPC .. B60W 50/0097; B60W 40/06; G06N 5/046; G06N 7/005
See application file for complete search history.

(56) References Cited

U.S. PATENT DOCUMENTS

| | | | |
|---|---|---|---|
| 2009/0259354 A1 | 10/2009 | Krupadanam et al. | |
| 2010/0246889 A1* | 9/2010 | Nara | G06K 9/00798 382/104 |
| 2017/0144658 A1* | 5/2017 | Viehmann | B62D 15/0265 |

FOREIGN PATENT DOCUMENTS

| | | |
|---|---|---|
| CN | 101673463 A | 3/2010 |
| CN | 101739824 A | 6/2010 |

(Continued)

OTHER PUBLICATIONS

Communication dated Oct. 27, 2020 from the China National Intellectual Property Administration in Application No. 201710244869.4.

(Continued)

Primary Examiner — Manuel A Rivera Vargas
(74) Attorney, Agent, or Firm — Sughrue Mion, PLLC (57) ABSTRACT

A road condition status prediction method is performed by a server and includes obtaining historical road segment information, the historical road segment information including road condition statuses and classification events that are used to classify the road condition statuses, and the classification events being determined based on content of the classification events, and obtaining an occurrence probability of each of the classification events, based on the obtained historical road segment information. The road condition status prediction method further includes obtaining a conditional probability of each of the classification events in each of the road condition statuses, based on the obtained historical road segment information, and predicting a road condition status of a road segment, based on the obtained (Continued)

occurrence probability of each of the classification events and the obtained conditional probability of each of the classification events in each of the road condition statuses.

20 Claims, 8 Drawing Sheets

(51) Int. Cl.
*G06N 5/04* (2006.01)
*G06N 7/00* (2006.01)

(56) References Cited

FOREIGN PATENT DOCUMENTS

| CN | 101783069 A | 7/2010 |
|---|---|---|
| CN | 101950477 A | 1/2011 |
| CN | 102509445 A | 6/2012 |
| CN | 102646332 A | 8/2012 |
| CN | 103903436 A | 7/2014 |
| CN | 104182618 A | 12/2014 |
| CN | 104298881 A | 1/2015 |
| CN | 104933856 A | 9/2015 |
| CN | 106092113 A | 11/2016 |
| CN | 106525058 A | 3/2017 |
| DE | 102015202554 B3 | 6/2016 |
| JP | 2010221859 A | 10/2010 |

OTHER PUBLICATIONS

Written Opinion of the International Searching Authority dated Jun. 19, 2018, in International Application No. PCT/CN2018/079872.
Communication dated May 14, 2020, from the State Intellectual Property Office of the P.R.C. in application No. 201710244869.4.
International Search Report of PCT/CN2018/079872 dated Jun. 19, 2018.

* cited by examiner

ROAD CONDITION STATUS PREDICTION METHOD, DEVICE, AND SERVER, AND STORAGE MEDIUM

CROSS-REFERENCE TO RELATED APPLICATIONS

This application is a continuation of International Application No. PCT/CN2018/079872 filed on Mar. 21, 2018, in the China National Intellectual Property Administration, which claims priority from Chinese Patent Application No. 201710244869.4 filed on Apr. 14, 2017, in the China National Intellectual Property Administration, which are incorporated herein by reference in their entireties.

BACKGROUND

1. Field

Methods and apparatuses consistent with embodiments relate to Internet of Vehicles technologies, and in particular, to a road condition status prediction method, a road condition status prediction device, a road condition status prediction server, and a storage medium.

2. Description of Related Art

In the modern society, with city development and road construction, intra-city and inter-city road conditions become very complex. To save a travelling time of a user, a road condition status may be predicted, and then a travelling path may be properly planned for the user according to the predicted road condition status. Road condition statuses include extremely congested, congested, ambling, smooth and the like.

In a related technology, when a road condition status is predicted, the following method may be used: capturing location information of a vehicle in real time by using a Global Positioning System (GPS); determining, according to the captured location information and a road network database, a road segment on which the vehicle is currently travelling, wherein the road network database stores a correspondence between location information and a road segment name; calculating a length of the road segment and a travelling time according to the captured location information, and then calculating a travelling speed of the vehicle according to the length of the road segment and the travelling time; calculating an average value of travelling speeds of at least two vehicles on the road segment; determining, from a correspondence between a speed range and a road condition status and according to the average value of the travelling speeds, a speed range within which the average value of the travelling speeds falls; and using a road condition status corresponding to the speed range as a road condition status of the road segment.

During actual application, a road condition status not only depends on a travelling speed of a vehicle, but also is affected by other factors. Because a road condition status is predicted only according to a travelling speed in the related technology, the predicted road condition status is inaccurate.

SUMMARY

According to embodiments, there is provided a road condition status prediction method, the road condition status prediction method being performed by a server, and the road condition status prediction method including obtaining historical road segment information, the historical road segment information including road condition statuses and classification events that are used to classify the road condition statuses, and the classification events being determined based on content of the classification events, and obtaining an occurrence probability of each of the classification events, based on the obtained historical road segment information. The road condition status prediction method further includes obtaining a conditional probability of each of the classification events in each of the road condition statuses, based on the obtained historical road segment information, and predicting a road condition status of a road segment, based on the obtained occurrence probability of each of the classification events and the obtained conditional probability of each of the classification events in each of the road condition statuses.

According to embodiments, there is provided a road condition status prediction device, the road condition status prediction device being disposed in a server, and the road condition status prediction device including at least one memory configured to store computer program code, and at least one processor configured to access the at least one memory and operate according to the computer program code. The computer program code includes information obtaining code configured to cause the at least one processor to obtain historical road segment information, the historical road segment information including road condition statuses and classification events that are used to classify the road condition statuses, and the classification events being determined based on content of the classification events. The computer program code further includes calculation code configured to cause the at least one processor to obtain an occurrence probability of each of the classification events, based on the obtained historical road segment information, and obtain a conditional probability of each of the classification events in each of the road condition statuses, based on the obtained historical road segment information. The computer program code further includes prediction code configured to cause the at least one processor to predict a road condition status of a road segment, based on the obtained occurrence probability of each of the classification events and the obtained conditional probability of each of the classification events in each of the road condition statuses.

According to embodiments, there is provided a non-transitory computer-readable storage medium storing instructions that cause at least one processor to obtain historical road segment information, the historical road segment information including road condition statuses and classification events that are used to classify the road condition statuses, and the classification events being determined based on content of the classification events, and obtain an occurrence probability of each of the classification events, based on the obtained historical road segment information. The instructions further cause the at least one processor to obtain a conditional probability of each of the classification events in each of the road condition statuses, based on the obtained historical road segment information, and predict a road condition status of a road segment, based on the obtained occurrence probability of each of the classification events and the obtained conditional probability of each of the classification events in each of the road condition statuses.

DETAILED DESCRIPTION OF EMBODIMENTS

To make objectives, technical solutions, and advantages of embodiments clearer, the following further describes implementations of the disclosure in detail with reference to the accompanying drawings.

In modern life, to facilitate travelling, a user may install various navigation applications in a terminal, and most of these navigation applications may have a function of predicting and displaying a real-time road condition status, and can more properly arrange a travelling path for the user according to the displayed real-time road condition status, thereby improving affairs handling efficiency of the user. Currently, when a road condition status is predicted, there may be two types of location information on which the prediction depends. One type is location information controlled by a national sector through a ground induction coil, a speed measurement camera or the like, and the other type is location information captured based on a GPS of a vehicle. In consideration of a plurality of factors such as costs, in the related technology, mainly, matching may be performed between location information captured based on a GPS and data in a road network database, a road segment on which a vehicle is currently travelling may be determined, and then a road condition status of the road segment may be predicted by calculating an average value of travelling speeds of at least two vehicles.

A travelling speed of a vehicle may be a main basis used to describe a road condition status. However, for some special road segments, for example, road segments near a school, a hospital, and a business district, many vehicles may be parked on road sides and there may be many pedestrians. Out of consideration of safety, travelling speeds of vehicles on these road segments may not be high. In the related technology, it may be predicted according to the travelling speed that the road condition status of the road segment is congested, but the prediction may be actually inaccurate. For another example, it may be set that a road condition status corresponding to a travelling speed of 20 to 30 km/h is congested and a road condition status corresponding to a travelling speed of 31 to 50 km/h is ambling, and when a travelling speed of a vehicle is 30 km/h, the travelling speed is a critical value, that is, a current road condition status is on the verge of a boundary between being congested and ambling. However, in the related technology, it may be predicted simply according to the travelling speed that the road condition status of the road segment is congested, but a prediction result may be actually inaccurate.

To improve accuracy of the predicted road condition status, the embodiments provide a road condition status prediction method. In the method, based on an analysis result obtained by analyzing historical road segment information, a conditional probability and an occurrence probability of each target classification event included in a to-be-predicted road segment are obtained, and then an obtained probability value is substituted into a Bayesian classification formula, so that an obtained road condition status can comprehensively reflect a current road condition of the road segment.

Figure 1A:
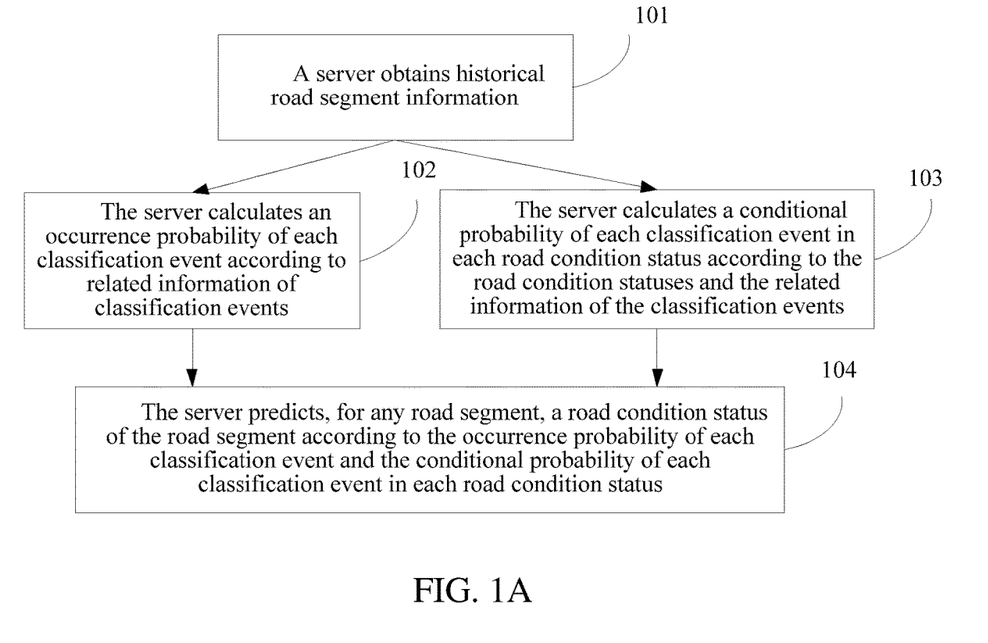
FIGS. 1A, 1B, 1C and 1D are flowcharts of a road condition status prediction method according to embodiments.

FIGS. 1A, 1B, 1C and 1D are flowcharts of a road condition status prediction method according to embodiments. Referring to FIG. 1A, the method includes operations described below.

In operation 101, a server obtains historical road segment information.

The historical road segment information includes road condition statuses and related information of classification events used to classify the road condition statuses. The road condition status is used to reflect a smooth extent of current transportation, including one of extremely congested, congested, ambling and smooth. The classification events are used to classify the road condition statuses, the classification events include a travelling speed of a vehicle on a current road segment, a free-flow speed, a road segment level, a city involved, a road condition status before a preset time, a travelling speed before the preset time, a road condition status of a designated road segment, a travelling speed of the vehicle on the designated road segment, whether it is a holiday, whether it is located near a special sector, whether it is a deceleration zone, and the like. The classification events are not specifically limited in these embodiments.

Figure 2:
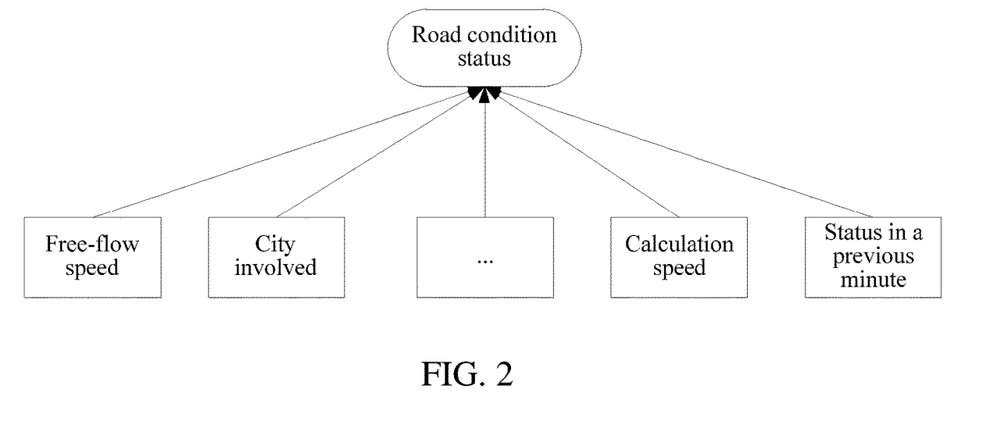
FIG. 2 is a schematic diagram of historical road segment information according to embodiments.

FIG. 2 is a schematic diagram of historical road segment information according to embodiments. In detail, FIG. 2 shows a plurality of classification events used to classify the road condition statuses.

The free-flow speed is a highest travelling speed on a road segment. Road segment levels are sequentially: expressway, city highway, national road, provincial road, county road, village or town road, another road and the like from high to low. The preset time may be determined by the server according to a historical road condition status of a city involved. If the historical road condition status of the city involved is relatively poor, and the city is usually in a congested or extremely congested status, a relatively small value may be selected for the preset time, for example, one minute or two minutes, to ensure that the obtained road condition status can be used to accurately predict the current road segment. If the historical road condition status of the city involved is quite well, and the city is usually in a smooth status, a relatively large value may be selected for the preset time, for example, five minutes or ten minutes, to reduce a processing pressure of the server. The server may further determine the preset time in another manner, which is not specifically limited in these embodiments. The designated road segment is a road segment that is before the current road segment and that is spaced apart from the current road segment by a preset quantity of road segments, and the preset quantity may be determined according to a length of the road segment. If the length of the road segment is relatively small, a relatively small number such as 1, 2, or 3 may be selected as the preset quantity. If the length of the road segment is relatively large, a relatively large number such as 5, 6, or 7 is selected as the preset quantity. The special sector may be a school, a hospital, a business district or the like. The deceleration zone may be a tunnel, a bend, a roundabout road or the like.

Related information of a classification event may be determined according to content of the classification event. If the classification event is a travelling speed of a vehicle on a current road segment, the related information of the classification event is a speed value of the travelling speed of the vehicle on the current road segment, a travelling direction and the like; if the classification event is a free-flow speed, the related information of the classification event is a speed value of a highest travelling speed of the vehicle on the current road segment and the like; if the classification event is a road level, the related information of the classification event is expressway, city highway, national road, provincial road, county road, village or town road, another road and the like; if the classification event is a city involved, the related information of the classification event is cities at home and abroad, for example, Beijing, Shanghai, and Nanjing; if the classification event is a road condition status before a preset time, the related information of the classification event is one of extremely congested, congested, ambling, and smooth; if the classification event is a travelling speed before the preset time, the related information of the classification event is a speed value of the travelling speed before the preset time, a travelling direction and the like; if the classification event is a road condition status of a designated road segment, the related information of the classification event is one of extremely congested, congested, ambling, and smooth; if the classification event is a travelling speed of a vehicle on a designated road segment, the related information of the classification event is a speed value of the travelling speed of the vehicle on the designated road segment, a travelling direction and the like; if the classification event is whether it is a holiday, the related information of the classification event is that it is a holiday or it is not a holiday; if the classification event is whether it is located near a special road segment, the related information of the classification event is that it is located near a special road segment or it is not located near a special road segment; and if the classification event is whether it is a deceleration zone, the related information of the classification event is that it is a deceleration zone or it is not a deceleration zone.

When the server obtains the historical road segment information, the obtaining includes but is not limited to the following manner: the server collects, by using cities, road segments, time and the like as collection conditions, road condition statuses of different cities, road condition statuses of different road segments of the same city, road condition statuses of the same road segment within different time, and the like, and then uses the collected road condition statuses and the collection conditions as historical road condition information. For convenience of subsequent application, after obtaining the historical road segment information, the server may store the obtained historical road segment information. During storage, the server may perform storage according to event names of classification events in a table form. When current prediction ends or a storage time reaches a preset time length, the server clears stored data. The preset time length may be determined according to a time length used in the prediction process, and the preset time length may be 7 days, 10 days or the like.

For a storage form of the historical road segment information, refer to Table 1.

Referring again to FIG. 1A, in operation 102, the server calculates an occurrence probability of each classification event according to related information of classification events.

Figure 1B:
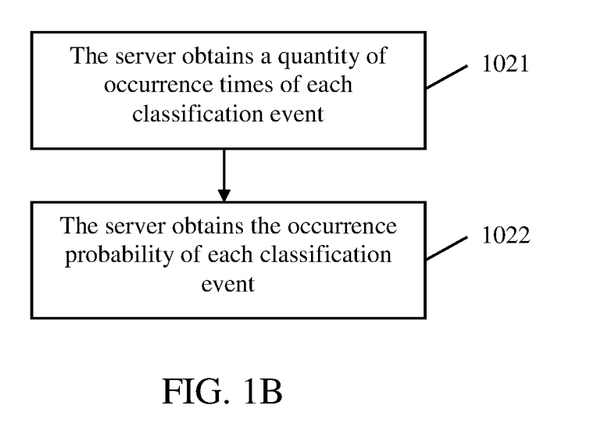

When the server calculates the occurrence probability of each classification event according to the related information of the classification events, the following operations 1021 to 1022 of FIG. 1B may be used.

In operation 1021, the server obtains a quantity of occurrence times of each classification event according to the related information of the classification events.

The historical road segment information includes the related information of the classification events used to classify the road condition statuses. Therefore, the server may obtain the quantity of occurrence times of each classification event by collecting statistics on the same classification event in the historical road segment information. In consideration of a difference between road segments of different cities and a difference between travelling habits of users, and in consideration of a difference between maximum travelling speeds of vehicles at different road segment levels, when collecting statistics on the same classification events in the historical road segment information, the server may classify the obtained historical road segment information according to a city involved, then further classify the historical road segment information of the same city according to road segment levels, and then collect statistics on a quantity of occurrence times of each classification event corresponding to different road segment levels of the same city.

For example, the server obtains 100000 pieces of historical road segment information, and classifies the obtained 100000 pieces of historical road segment information according to cities involved, to obtain 20000 pieces of historical road segment information of Beijing, 30000 pieces of historical road segment information of Shanghai, 10000 pieces of historical road segment information of Shijiazhuang, 15000 pieces of historical road segment information of Chengdu, and 25000 pieces of historical road segment information of Shenzhen. Using the historical road segment information of Beijing as an example, the server classifies the 20000 pieces of historical road segment information according to road segment levels, to obtain historical road segment information corresponding to different road segment levels, and then obtains a quantity of occurrence times of each classification event by collecting statistics on a quantity of occurrence times of each classification event in the historical road segment information corresponding to the different road segment levels.

In operation 1022, the server obtains the occurrence probability of each classification event according to the quantity of occurrence times of each classification event and a quantity of information pieces of the historical road segment information.

The server obtains an occurrence probability of each classification event by calculating a ratio of a quantity of

TABLE 1

| Calculate a current road speed | Free-flow speed | Whether it is near an entrance to a school | Whether it is near an entrance to a hospital | Whether it is near an entrance to a shopping mall | Whether it is a deceleration zone such as a roundabout | Whether it is a holiday | Status in a previous minute | Speed in a previous minute | Road segment level | City involved |
| --- | --- | --- | --- | --- | --- | --- | --- | --- | --- | --- | occurrence times of each classification event corresponding to the same road segment level of the same city to a quantity of information pieces of historical road segment information corresponding to the same road segment level of the same city.

For example, if the server obtains 2000 pieces of historical road segment information of an expressway of Beijing, and obtains 400 pieces of historical road segment information of a deceleration zone from the 2000 pieces of historical road segment information, it may be learned that an occurrence probability of the deceleration zone is 400/2000=0.2.

Referring again to FIG. 1A, in operation 103, the server calculates a conditional probability of each classification event in each road condition status according to the road condition statuses and the related information of the classification events.

Figure 1C:
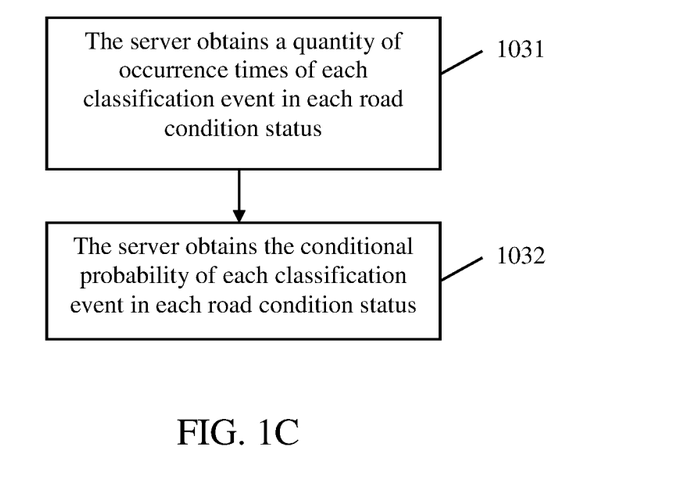

When the server obtains the conditional probability of each classification event in each road condition status according to the road condition statuses and the related information of the classification events, the following operations 1031 to 1032 of FIG. 1C may be used.

In operation 1031, the server obtains a quantity of occurrence times of each classification event in each road condition status according to the road condition statuses and the related information of the classification events.

After classifying the obtained historical road segment information according to the city involved and the road segment level, the server may collect statistics on a quantity of occurrence times of each classification event in each road condition status according to the historical road segment information corresponding to the same road segment level of the same city.

In operation 1032, the server obtains the conditional probability of each classification event in each road condition status according to the quantity of occurrence times of each classification event in each road condition status and a quantity of information pieces of the historical road segment information in each road condition status.

The server obtains a conditional probability of each classification event in each road condition status by obtaining a ratio of a quantity of occurrence times of each classification event corresponding to the same road segment level of the same city in each road condition status to a quantity of information pieces of historical road segment information corresponding to the same road segment level of the same city in each road condition status.

For example, if the server obtains 2000 pieces of historical road segment information in each road condition status, and learns, from the 2000 pieces of historical road segment information, that a deceleration zone has 1000 pieces of historical road segment information under the extremely congested condition, 500 pieces of historical road segment information under the congested condition, 400 pieces of historical road segment information under the ambling condition, and 100 pieces of historical road segment information under the smooth condition, it may be learned that the conditional probability of the deceleration zone under the extremely congested condition is equal to 1000/2000=0.5, the conditional probability of the deceleration zone under the congested condition is equal to 500/2000=0.25, the conditional probability of the deceleration zone under the ambling condition is equal to 400/2000=0.2, and the conditional probability of the deceleration zone under the smooth condition is equal to 100/2000=0.05.

For another example, if the server obtains 2000 pieces of historical road segment information of Beijing, where 100 pieces of historical road segment information are historical road segment information of an expressway; and among the 100 pieces of historical road segment information of the expressway, a quantity of pieces of historical road segment information for which the road condition status is congested is 10, and a quantity of pieces of historical road segment information for which the road condition status is smooth is 70, it may be learned that a probability of smoothness of the expressway is 70/100=0.7, and among the 70 pieces of historical road segment information for which the road condition status is smooth, conditional probabilities of several classification events in the smooth road condition status such as a travelling speed of a vehicle on a current road segment, a free-flow speed, a road condition status of a previous road segment, a road condition status in a previous a travelling speed in the previous minute, whether it is near an entrance to a school, whether it is near an entrance to a hospital, whether it is near an entrance to a shopping mall, whether it is a deceleration zone such as a roundabout road, and whether it is a holiday may be obtained. Table 2 shows a conditional probability of a travelling speed of a vehicle on a current road segment in the smooth road condition status, Table 3 shows a conditional probability of a free-flow speed in the smooth road condition status, Table 4 shows a conditional probability of a road condition status of a previous road segment in the smooth road condition status, Table 5 shows a conditional probability of a road condition status in a previous minute in the smooth road condition status, Table 6 shows a conditional probability of a travelling speed in the previous minute in the smooth road condition status, and Table 7 shows conditional probabilities of whether it is near an entrance to a school, whether it is near an entrance to a hospital, whether it is near an entrance to a shopping mall, whether it is a deceleration zone such as a roundabout road, and whether it is a holiday in the smooth road condition status.

TABLE 2

| value | Event Travelling speed of a vehicle on a current road segment |
|---|---|
| 0.2 | 0 to 30 |
| 0.5 | 31 to 40 |
| 0.3 | 41 or more |

TABLE 3

| Value | Event Free-flow speed |
|---|---|
| 0.2 | 50 to 60 |
| 0.6 | 61 to 80 |
| 0.2 | 81 or more |

TABLE 4

| Value | Event Road condition status of a previous road segment |
|---|---|
| 0.6 | Smooth |
| 0.3 | Ambling |
| 0.15 | Congested |
| 0.05 | Extremely congested |

TABLE 5

| Value | Event<br>Road condition status in a previous minute |
|---|---|
| Smooth | 0.6 |
| Ambling | 0.3 |
| Congested | 0.15 |
| Extremely congested | 0.05 |

TABLE 6

| Value | Event<br>Travelling speed in a previous minute |
|---|---|
| 0 to 30 | 0.1 |
| 31 to 40 | 0.6 |
| 41 or more | 0.3 |

TABLE 7

| | Event | | | | |
|---|---|---|---|---|---|
| Value | Whether it is near an entrance to a school | Whether it is near an entrance to a hospital | Whether it is near an entrance to a shopping mall | Whether it is a deceleration zone such as a roundabout | Whether it is a holiday |
| Yes | 0.01 | 0.01 | 0.01 | 0.01 | 0.08 |
| No | 99.99 | 99.99 | 99.99 | 99.99 | 99.92 |

In the foregoing operations 102 and 103, only an example in which the historical road segment information is classified according to a city involved and a road level is used. During actual application, the historical road segment information may be further classified according to a requirement by using other classification events. Details are not described one by one again herein.

Travelling speeds of the vehicle are continuous in the travelling process. For convenience of analyzing road condition statuses at different travelling speeds, in these embodiments, the server further divides travelling speeds in the same road condition status into different speed ranges according to different road segment levels, and performs iterative optimization on the travelling speeds within the different ranges. Division and iterative optimization performed on the travelling speeds not only facilitate statistics collection, but also improve accuracy of the travelling speeds within the different ranges.

Referring again to FIG. 1A, in operation 104, the server predicts, for any road segment, a road condition status of the road segment according to the occurrence probability of each classification event and the conditional probability of each classification event in each road condition status.

Figure 1D:
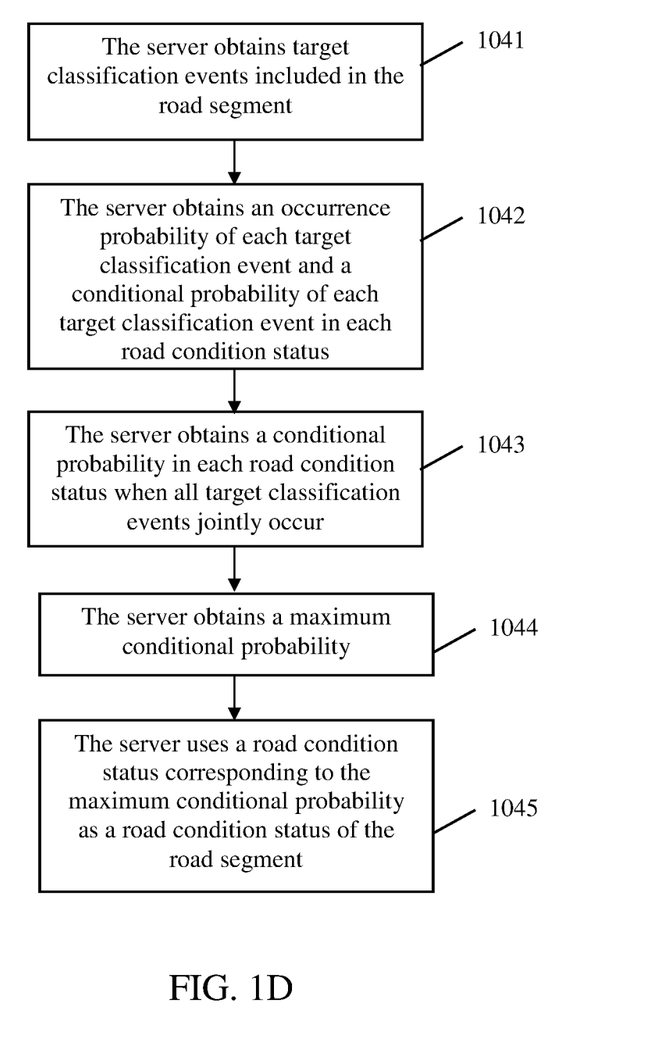

When the server predicts, for any road segment, the road condition status of the road segment according to the occurrence probability of each classification event and the conditional probability of each classification event in each road condition status, the following operations 1041 to 1045 of FIG. 1D may be used.

In operation 1041, the server obtains target classification events included in the road segment.

In these embodiments, the user may input a starting point and an end point to a navigation application according to a travelling requirement, the terminal sends the starting point and the end point input by the user to the server, the server plans, by using a path planning algorithm, a navigation path pointing to the end point from the starting point for the user in advance, the navigation path includes a plurality of road segments, and in these embodiments, description is made by using an example in which a road condition status of any one of the road segments is predicted. Path planning algorithms include the Dijkstra's algorithm, the Floyd's algorithm, the Shortest Path Faster algorithm (SPFA), the A* algorithm (that is, the A-Star algorithm, being an algorithm for solving a shortest path in a static road network), the D* algorithm (that is, the dynamic A* algorithm), the graph-based shortest-path algorithm, the genetic algorithm, the cellular automaton algorithm, the immune algorithm, the Tabu search algorithm, the simulated annealing algorithm, the artificial neural network algorithm, the ant colony algorithm, the particle swarm optimization algorithm and the like. To save the travelling time of the user and improve the affairs handling efficiency, after the server plans the navigation path for the user, the server predicts a road condition status of each road segment in the planned navigation path, and then adjusts the planned navigation path in time according to the predicted road condition status.

In these embodiments, the server stores a road network database in advance, wherein the road network database stores information such as cities involved, road segment names, free-flow speeds, road segment levels, and names of other buildings around road segments, and the server may obtain, based on the road network database, information such as a road level, a free-flow speed, a city involved, whether it is located near a special sector, and whether it is a deceleration zone from the road network database, obtain information such as a travelling speed of a vehicle on a current road segment, a road condition status before a preset time, a travelling speed before the preset time, a road condition status of a designated road segment, and a travelling speed of the vehicle on the designated road segment from the Internet, and use, as target classification events, the information obtained from the road network database and the Internet.

In operation 1042, the server obtains, from the occurrence probability of each classification event and the conditional probability of each classification event in each road condition status, an occurrence probability of each target classification event and a conditional probability of each target classification event in each road condition status.

Based on the occurrence probability of each classification event and the conditional probability of each classification event in each road condition status that are stored, the server may obtain, from the occurrence probability of each classification event according to each target classification event, an occurrence probability of a classification event having the same name as that of a target classification event, and use the obtained occurrence probability as the occurrence probability of the target classification event. The server may obtain, from the conditional probability of each classification event in each road condition status according to each classification event, a conditional probability of a classification event in each road condition status having the same name as that of a target classification event, and use the obtained conditional probability as a conditional probability of each target classification event in each road condition status.

In operation 1043, the server inputs the occurrence probability of each target classification event and the conditional probability of each target classification event in each road condition status to a conditional probability expression in each road condition status when all classification events jointly occur, to obtain a conditional probability in each road condition status when all target classification events jointly occur.

The conditional probability expression may be determined according to a Bayesian classification formula. The Bayesian classification formula is a formula for performing classification by using probability statistics knowledge, and the Bayesian classification formula may be represented as $P(C/X)*P(X)=P(C)*P(X/C)$. In these embodiments, C indicates a road condition status, including extremely congested, congested, ambling, smooth and the like; P(C) indicates an occurrence probability of a road condition status, wherein the server may calculate a quantity of occurrence times of each road condition status and calculate an occurrence probability based on the quantity of occurrence times of each road condition status; X indicates a classification event set; P(X) indicates an occurrence probability of each classification event; and P(C/X) indicates a conditional probability of a road condition status when all classification events jointly occur.

Based on the Bayesian classification formula, an expression of a conditional probability of each road condition status when all classification events jointly occur is $P(C_{i=1}^{4}/X)=P(C_{i=1}^{4})*\Pi_{j=1}^{m}P(A_j/C_{i=1}^{4})/\Pi_{j=1}^{m}P(A_j)$. i indicates a road condition status, and a value of the road condition statuses i is 1 to 4; j indicates a classification event, a value of the classification event j is 1 to m, and m is equal to a quantity of classification events; and $A_j$ indicates a classification event, $P(X)=\Pi_{j=1}^{m}P(A_j)$, all classification events in C have a correlation with each other, and all classification events are independent of each other. In the method provided in these embodiments, a factor affecting road condition status prediction is used as a classification event (independent variable), a road condition status prediction result is used as a classification event result (dependent variable), and a road condition status is predicted by using a relationship between an independent variable and each dependent variable. Use of such a manner not only maintains independence between classification events, but also improves accuracy of a prediction result.

Based on the occurrence probability of each target classification event and the conditional probability of each target classification event in each road condition status that are obtained, the server may obtain, by inputting the occurrence probability of each target classification event and the conditional probability of each target classification event in each road condition status to the conditional probability expression $P(C_{i=1}^{4}/X)=P(C_{i=1}^{4})*\Pi_{j=1}^{m}P(A_j/C_{i=1}^{4})/\Pi_{j=1}^{m}P(A_j)$, a conditional probability in each road condition status when all target classification events jointly occur. For example, when a conditional probability in a smooth road condition status when all target classification events jointly occur is calculated, the occurrence probability of each target classification event and a conditional probability of each target classification event in the smooth road condition status may be input to the foregoing expression; and when a conditional probability in a congested road condition status when all target classification events jointly occur is calculated, the occurrence probability of each target classification event and a conditional probability of each target classification event in the congested road condition status may be input to the foregoing expression.

All classification events are independent of each other, and some of the classification events are mutually exclusive, that is, some classification events cannot be obtained at the same time; therefore, when the conditional probability in each road condition status when all target classification events jointly occur is calculated by using the conditional probability expression $P(C_{i=1}^{4}/X)=P(C_{i=1}^{4})*\Pi_{j=1}^{m}P(A_j/C_{i=1}^{4})/\Pi_{j=1}^{m}P(A_j)$, a conditional probability and an occurrence probability of only a target classification event that can be obtained are input to the conditional probability expression. For example, if a quantity of classification events is 12, and three target classification events are obtained from a road segment, when a road condition status of the road segment is predicted, only the three obtained classification events are considered, that is, only occurrence probabilities of the three target classification events and conditional probabilities of the three classification events in each road condition status are input to the conditional probability expression.

In operation 1044, the server obtains a maximum conditional probability from the conditional probability in each road condition status when all target classification events jointly occur.

For example, the server learns, by using the foregoing operation 1043, that a conditional probability in the smooth road condition statuses when all target classification events jointly occur is 0.6, a conditional probability in the ambling road condition statuses when all target classification events jointly occur is 0.3, a conditional probability in the congested road condition statuses when all target classification events jointly occur is 0.15, and a conditional probability in the extremely congested road condition statuses when all target classification events jointly occur is 0.05, and the server may learn, from the foregoing results, that the maximum conditional probability is 0.6.

In operation 1045, the server uses a road condition status corresponding to the maximum conditional probability as a road condition status of the road segment.

The road condition status corresponding to the maximum conditional probability is a most probable road condition status of the road segment predicted by the server in consideration of a plurality of factors. Therefore, the road condition status corresponding to the maximum conditional probability is used as the road condition status of the road segment, which is more comprehensive and accurate than judgment performed only in dependence on a travelling speed.

Figure 3:
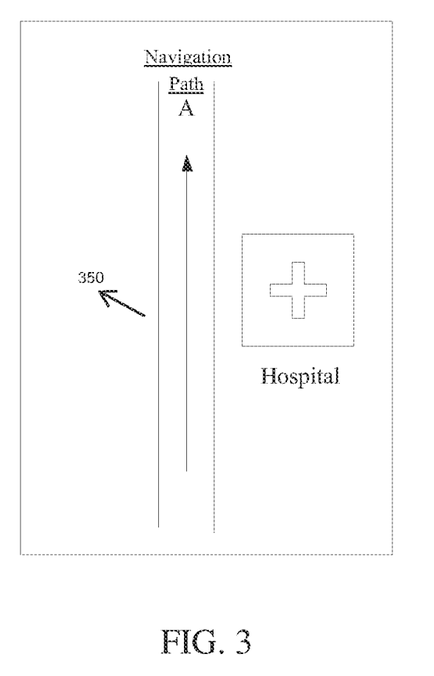
FIG. 3 is a schematic diagram of a road segment according to embodiments.

FIG. 3 is a schematic diagram of a road segment according to embodiments. In detail, FIG. 3 shows a road segment 350 of a navigation path A planned by the server for the user. When predicting a road condition status of the road segment, the server learns that a target classification event is being near a special road segment, a holiday, a travelling speed of a vehicle on a current road segment, a free-flow speed and the like. After calculating a conditional probability in each road condition status when all target classification events jointly occur, the server obtains a maximum conditional probability from the conditional probability in each road condition status when all target classification events jointly occur, and then uses a road condition status corresponding to the maximum conditional probability as a road condition status of the road segment.

In consideration of the processing pressure and the processing speed of the server, in the method provided in these embodiments, in addition to that an occurrence probability of each classification event and a conditional probability of each classification event in each road condition status are obtained in real time according to the historical road segment information each time a road condition status is predicted by using the foregoing method, the occurrence probability of each classification event and the conditional probability of each classification event in each road condition status may be further stored into the server. In this way, each time a road condition status is predicted, the occurrence probability of each classification event and the conditional probability of each classification event in each road condition status may be obtained directly from the server, and do not need to be obtained again. For this case, the server may determine, according to the Bayesian classification formula, a conditional probability expression in each road condition status when all classification events jointly occur, and then construct a road condition status prediction model according to the conditional probability expression in each road condition status when all classification events jointly occur, the occurrence probability of each classification event and the conditional probability of each classification event in each road condition status. Therefore, when subsequently predicting a road condition status of any road segment, the server performs prediction by using the road condition status prediction model, and prediction efficiency can be improved.

An example in which a road condition status of a road segment in a navigation path is predicted is used above. For prediction of another road segment, refer to the process of predicting the road condition status of the road segment. Details are not described herein again.

Based on the method provided in these embodiments, an occurrence probability of each classification event in historical road segment information and a conditional probability of each classification event in each road condition status are obtained, and a road condition status of a road segment is predicted based on an obtaining result. Because the road condition status is predicted with the help of a plurality of classification events and probabilities of the classification events but instead of depending on only a travelling speed of a vehicle, the predicted road condition status is more accurate.

Figure 4:
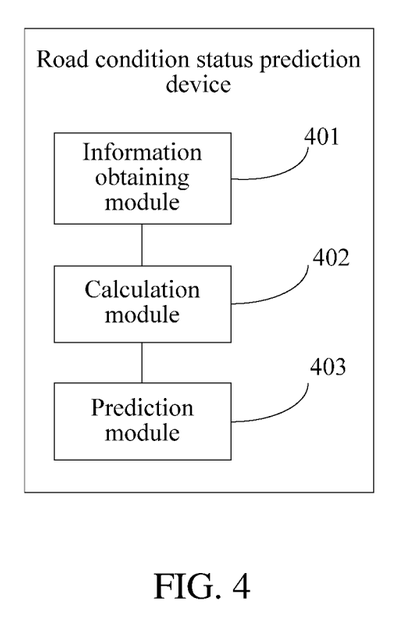
FIG. 4 is a block diagram of a road condition status prediction device according to embodiments.

FIG. 4 is a block diagram of a road condition status prediction device according to embodiments. The device may be disposed in a server, and includes an information obtaining module 401, a calculation module 402 and a prediction module 403.

The information obtaining module 401 is configured to obtain historical road segment information, the historical road segment information including road condition statuses and related information of classification events used to classify the road condition statuses, the classification events being used to classify the road condition statuses, and the related information of the classification events being determined according to content of the classification events.

The calculation module 402 is configured to obtain an occurrence probability of each classification event according to the related information of the classification events.

The calculation module 402 is further configured to obtain a conditional probability of each classification event in each road condition status according to the road condition statuses and the related information of the classification events.

The prediction module 403 is configured to predict, for any road segment, a road condition status of the road segment according to the occurrence probability of each classification event and the conditional probability of each classification event in each road condition status.

In other embodiments, the calculation module 402 is configured to obtain a quantity of occurrence times of each classification event according to the related information of the classification events; and obtain the occurrence probability of each classification event according to the quantity of occurrence times of each classification event and a quantity of information pieces of the historical road segment information.

In other embodiments, the calculation module 402 is configured to obtain a quantity of occurrence times of each classification event in each road condition status according to the road condition statuses and the related information of the classification events; and obtain the conditional probability of each classification event in each road condition status according to the quantity of occurrence times of each classification event in each road condition status and a quantity of information pieces of the historical road segment information in each road condition status.

In other embodiments, the prediction module 403 is configured to obtain target classification events included in the road segment; obtain, from the occurrence probability of each classification event and the conditional probability of each classification event in each road condition status, an occurrence probability of each target classification event and a conditional probability of each target classification event in each road condition status; input the occurrence probability of each target classification event and the conditional probability of each target classification event in each road condition status to a conditional probability expression in each road condition status when all classification events jointly occur, to obtain a conditional probability in each road condition status when all target classification events jointly occur, wherein the conditional probability expression is determined according to a Bayesian classification formula; obtain a maximum conditional probability from the conditional probability in each road condition status when all target classification events jointly occur; and use a road condition status corresponding to the maximum conditional probability as a road condition status of the road segment.

In other embodiments, the classification events include a travelling speed of a vehicle on a current road segment, a free-flow speed, a road segment level, a city involved, a road condition status before a preset time, a travelling speed before the preset time, a road condition status of a designated road segment, a travelling speed of the vehicle on the designated road segment, whether it is a holiday, whether it is located near a special sector and whether it is a deceleration zone, wherein the designated road segment is a road segment that is before the current road segment and that is spaced apart from the current road segment by a preset quantity of road segments.

To sum up, based on the device provided in these embodiments, an occurrence probability of each classification event in historical road segment information and a conditional probability of each classification event in each road condition status are obtained, and a road condition status of a road segment is predicted based on an obtaining result. Because the road condition status is predicted with the help of a plurality of classification events and probabilities of the classification events but instead of depending on only a travelling speed of a vehicle, the predicted road condition status is more accurate.

Figure 5:
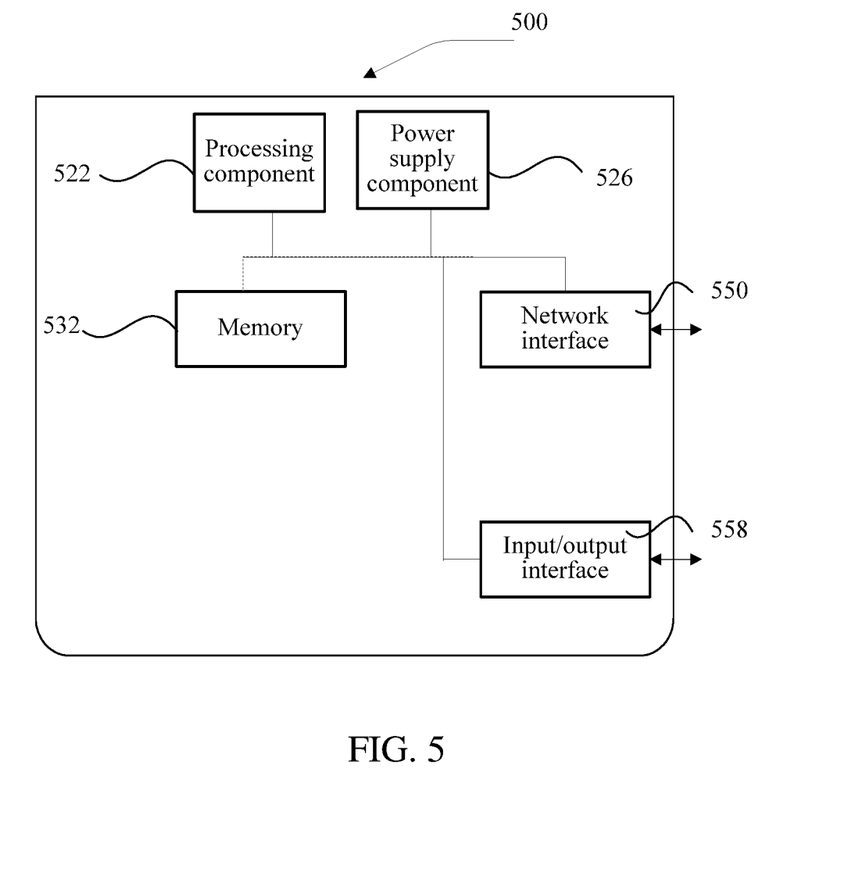
FIG. 5 is a block diagram of a road condition status prediction server according to embodiments.

FIG. 5 is a block diagram of a road condition status prediction server according to embodiments. Referring to FIG. 5, a server 500 includes a processing component 522, which includes one or more processors, and a memory resource represented by a memory 532. The memory resource is used for storing an instruction that can be executed by the processing component 522, for example, an application program. The application program stored in the memory 532 may include one or more modules each of which corresponds to a set of instructions. In addition, the processing component 522 is configured to execute the instruction, to perform the function performed by the server in the foregoing road condition status prediction method.

The server 500 may further include a power supply component 526, configured to perform power supply management of the server 500, a wired or wireless network interface 550, configured to connect the server 500 to a network, and an input/output (I/O) interface 558. The server 500 may operate an operating system that is stored in the memory 532, for example, Windows Server™, Mac OS X™, Unix™, Linux™, or FreeBSD™.

Based on the server provided in these embodiments, an occurrence probability of each classification event in historical road segment information and a conditional probability of each classification event in each road condition status are obtained, and a road condition status of a road segment is predicted based on an obtaining result. Because the road condition status is predicted with the help of a plurality of classification events and probabilities of the classification events but instead of depending on only a travelling speed of a vehicle, the predicted road condition status is more accurate.

Embodiments provide a storage medium, the storage medium storing at least one instruction, at least one program, a code set or an instruction set, and the at least one instruction, the at least one program, the code set or the instruction set being loaded and executed by the processor to implement the road condition status prediction method shown in FIGS. 1A, 1B, 1C and 1D.

Division of the foregoing functional modules is only described for example purposes when the road condition status prediction device or server provided in the foregoing embodiments predicts a road condition status. In an actual application, the foregoing functions may be allocated to be accomplished by different functional modules according to requirements, that is, the internal structure of the road condition status prediction device or server is divided into different functional modules, to accomplish all or some functions of the above described functions. In addition, an inventive concept of the road condition status prediction device and server provided in the foregoing embodiments is the same as that of the road condition status prediction method embodiments. For an implementation process, refer to the method embodiments for details, and details are not described herein again.

A person of ordinary skill in the technology may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are examples of the embodiments, and are not intended to limit the embodiments. Any modification, equivalent replacement, improvement, or the like made within the spirit and principle of the embodiments shall fall within the protection scope of the embodiments.

What is claimed is:

1. A road condition status prediction method, the road condition status prediction method being executable by a processor associated with a server, and the road condition status prediction method comprising:
    obtaining historical road segment information, the historical road segment information comprising road condition statuses and classification events that are used to classify the road condition statuses, and the classification events being determined based on content of the classification events;
    obtaining an occurrence probability of each of the classification events, based on the obtained historical road segment information;
    obtaining a conditional probability of each of the classification events in each of the road condition statuses, based on the obtained historical road segment information; and
    predicting a road condition status of a road segment, based on the obtained occurrence probability of each of the classification events and the obtained conditional probability of each of the classification events in each of the road condition statuses.

2. The road condition status prediction method of claim 1, wherein the predicting the road condition status of the road segment comprises:
    obtaining target classification events comprised in the road segment;
    obtaining, from the obtained occurrence probability of each of the classification events and the obtained conditional probability of each of the classification events in each of the road condition statuses, an occurrence probability of each of the obtained target classification events and a conditional probability of each of the obtained target classification events in each of the road condition statuses;
    inputting the obtained occurrence probability of each of the target classification events and the obtained conditional probability of each of the target classification events in each of the road condition statuses, to a conditional probability expression of each of the road condition statuses when all of the classification events jointly occur, to obtain a conditional probability of each of the road condition statuses when all of the target classification events jointly occur, the conditional probability expression being determined based on a Bayesian classification formula;
    obtaining one of the road condition statues having a maximum conditional probability among the obtained conditional probability of each of the road condition statuses when all of the target classification events jointly occur; and
    predicting the obtained one of the road condition statues having the maximum conditional probability, as the road condition status of the road segment.

3. The road condition status prediction method of claim 2, wherein the Bayesian classification formula is represented as $P(C/X)*P(X)=P(C)*P(X/C)$, and
    wherein C indicates one of the road condition statuses, $P(C)$ indicates the occurrence probability of the one of the road condition statuses, X indicates the classification events, $P(X)$ indicates the occurrence probability of each of the classification events, and $P(C/X)$ indicates the conditional probability of the one of the road condition statuses when all of the classification events jointly occur.

4. The road condition status prediction method of claim 1, wherein the obtaining the occurrence probability of each of the classification events comprises:
   obtaining a quantity of occurrence times of each of the classification events, based on the obtained historical road segment information; and
   obtaining the occurrence probability of each of the classification events, based on the obtained quantity of occurrence times of each of classification events and a quantity of information pieces of the obtained historical road segment information.

5. The road condition status prediction method of claim 1, wherein the obtaining the conditional probability of each of the classification events in each of the road condition statuses comprises:
   obtaining a quantity of occurrence times of each of the classification events in each of the road condition statuses, based on the obtained historical road segment information; and
   obtaining the conditional probability of each of the classification events in each of the road condition statuses, based on the obtained quantity of occurrence times of each of the classification events in each of the road condition statuses and a quantity of information pieces of the obtained historical road segment information in each of the road condition statuses.

6. The road condition status prediction method of claim 1, wherein the classification events comprise a travelling speed of a vehicle on a current road segment, a free-flow speed, a road segment level, a city involved, a road condition status before a preset time, a travelling speed before the preset time, a road condition status of a designated road segment, a travelling speed of the vehicle on the designated road segment, and whether a respective one of the classification events is any one or any combination of a holiday, located near a special sector and a deceleration zone, and
   wherein the designated road segment is before the current road segment and spaced apart from the current road segment by a preset quantity of road segments.

7. The road condition status prediction method of claim 1, wherein the road condition statuses comprise extremely congested, congested, ambling and smooth.

8. A road condition status prediction device, the road condition status prediction device being disposed in a server, and the road condition status prediction device comprising:
   at least one memory configured to store computer program code; and
   at least one processor configured to access the at least one memory and operate according to the computer program code, the computer program code comprising:
      information obtaining code configured to cause the at least one processor to obtain historical road segment information, the historical road segment information comprising road condition statuses and classification events that are used to classify the road condition statuses, and the classification events being determined based on content of the classification events;
      calculation code configured to cause the at least one processor to:
         obtain an occurrence probability of each of the classification events, based on the obtained historical road segment information; and
         obtain a conditional probability of each of the classification events in each of the road condition statuses, based on the obtained historical road segment information; and
      prediction code configured to cause the at least one processor to predict a road condition status of a road segment, based on the obtained occurrence probability of each of the classification events and the obtained conditional probability of each of the classification events in each of the road condition statuses.

9. The road condition status prediction device of claim 8, wherein the prediction code is further configured to cause the at least one processor to:
   obtain target classification events comprised in the road segment;
   obtain, from the obtained occurrence probability of each of the classification events and the obtained conditional probability of each of the classification events in each of the road condition statuses, an occurrence probability of each of the obtained target classification events and a conditional probability of each of the obtained target classification events in each of the road condition statuses;
   input the obtained occurrence probability of each of the target classification events and the obtained conditional probability of each of the target classification events in each of the road condition statuses, to a conditional probability expression of each of the road condition statuses when all of the classification events jointly occur, to obtain a conditional probability of each of the road condition statuses when all of the target classification events jointly occur, the conditional probability expression being determined based on a Bayesian classification formula;
   obtain one of the road condition statues having a maximum conditional probability among the obtained conditional probability of each of the road condition statuses when all of the target classification events jointly occur; and
   predict the obtained one of the road condition statues having the maximum conditional probability, as the road condition status of the road segment.

10. The road condition status prediction device of claim 9, wherein the Bayesian classification formula is represented as $P(C/X)*P(X)=P(C)*P(X/C)$, and
   wherein C indicates one of the road condition statuses, P(C) indicates the occurrence probability of the one of the road condition statuses, X indicates the classification events, P(X) indicates the occurrence probability of each of the classification events, and P(C/X) indicates the conditional probability of the one of the road condition statuses when all of the classification events jointly occur.

11. The road condition status prediction device of claim 8, wherein the calculation code is further configured to cause the at least one processor to:
   obtain a quantity of occurrence times of each of the classification events, based on the obtained historical road segment information; and
   obtain the occurrence probability of each of the classification events, based on the obtained quantity of occurrence times of each of classification events and a quantity of information pieces of the obtained historical road segment information.

12. The road condition status prediction device of claim 8, wherein the calculation code is further configured to cause the at least one processor to:

obtain a quantity of occurrence times of each of the classification events in each of the road condition statuses, based on the obtained historical road segment information; and obtain the conditional probability of each of the classification events in each of the road condition statuses, based on the obtained quantity of occurrence times of each of the classification events in each of the road condition statuses and a quantity of information pieces of the obtained historical road segment information in each of the road condition statuses.

13. The road condition status prediction device of claim 8, wherein the classification events comprise a travelling speed of a vehicle on a current road segment, a free-flow speed, a road segment level, a city involved, a road condition status before a preset time, a travelling speed before the preset time, a road condition status of a designated road segment, a travelling speed of the vehicle on the designated road segment, and whether a respective one of the classification events is any one or any combination of a holiday, located near a special sector and a deceleration zone, and wherein the designated road segment is before the current road segment and spaced apart from the current road segment by a preset quantity of road segments.

14. The road condition status prediction device of claim 8, wherein the road condition statuses comprise extremely congested, congested, ambling and smooth.

15. A non-transitory computer-readable storage medium storing instructions that cause at least one processor to:

obtain historical road segment information, the historical road segment information comprising road condition statuses and classification events that are used to classify the road condition statuses, and the classification events being determined based on content of the classification events;

obtain an occurrence probability of each of the classification events, based on the obtained historical road segment information;

obtain a conditional probability of each of the classification events in each of the road condition statuses, based on the obtained historical road segment information; and predict a road condition status of a road segment, based on the obtained occurrence probability of each of the classification events and the obtained conditional probability of each of the classification events in each of the road condition statuses.

16. The non-transitory computer-readable storage medium of claim 15, wherein the instructions further cause the at least one processor to:

obtain a quantity of occurrence times of each of the classification events, based on the obtained historical road segment information; and obtain the occurrence probability of each of the classification events, based on the obtained quantity of occurrence times of each of classification events and a quantity of information pieces of the obtained historical road segment information.

17. The non-transitory computer-readable storage medium of claim 15, wherein the instructions further cause the at least one processor to:

obtain a quantity of occurrence times of each of the classification events in each of the road condition statuses, based on the obtained historical road segment information; and obtain the conditional probability of each of the classification events in each of the road condition statuses, based on the obtained quantity of occurrence times of each of the classification events in each of the road condition statuses and a quantity of information pieces of the obtained historical road segment information in each of the road condition statuses.

18. The non-transitory computer-readable storage medium of claim 15, wherein the instructions further cause the at least one processor to:

obtain target classification events comprised in the road segment;

obtain, from the obtained occurrence probability of each of the classification events and the obtained conditional probability of each of the classification events in each of the road condition statuses, an occurrence probability of each of the obtained target classification events and a conditional probability of each of the obtained target classification events in each of the road condition statuses;

input the obtained occurrence probability of each of the target classification events and the obtained conditional probability of each of the target classification events in each of the road condition statuses, to a conditional probability expression of each of the road condition statuses when all of the classification events jointly occur, to obtain a conditional probability of each of the road condition statuses when all of the target classification events jointly occur, the conditional probability expression being determined based on a Bayesian classification formula;

obtain one of the road condition statues having a maximum conditional probability among the obtained conditional probability of each of the road condition statuses when all of the target classification events jointly occur; and predict the obtained one of the road condition statues having the maximum conditional probability, as the road condition status of the road segment.

19. The non-transitory computer-readable storage medium of claim 15, wherein the classification events comprise a travelling speed of a vehicle on a current road segment, a free-flow speed, a road segment level, a city involved, a road condition status before a preset time, a travelling speed before the preset time, a road condition status of a designated road segment, a travelling speed of the vehicle on the designated road segment, and whether a respective one of the classification events is any one or any combination of a holiday, located near a special sector and a deceleration zone, and wherein the designated road segment is before the current road segment and spaced apart from the current road segment by a preset quantity of road segments.

20. The non-transitory computer-readable storage medium of claim 15, wherein the road condition statuses comprise extremely congested, congested, ambling and smooth.

* * * * *